Patented Mar. 2, 1943

2,312,467

UNITED STATES PATENT OFFICE 2,312,467

STABILIZED PROTEIN CURD

Francis Clarke Atwood, Newtonville, Mass., assignor to Atlantic Research Associates, Inc. Newtonville, Mass., a corporation of Delaware No Drawing. Application October 16, 1937. Serial No. 169,469

2 Claims. (Cl. 106—138)

The present invention relates to a stabilized moisture containing protein product and to the method of preparing the same. More particularly the invention relates to an undispersed moist casein curd having, nevertheless, a dry appearance. It is adaptable for shipment in bags and is further characterized over long periods of time by its stability, its uniform plasticity, and freedom from liberating its water content.

Casein is a complex protein and is ordinarily obtained by precipitation from skim milk. The various commercial methods of obtaining a precipitated casein from skim milk are described in detail in the U. S. Department of Agriculture circular No. 279, published in July, 1933. The invention is not limited to any particular method of obtaining the casein curd and any method of initially precipitating the casein may be employed, for example, the methods described in the above mentioned circular.

After the wet casein curd has been precipitated, it is usually pressed to remove a portion of the water, although the curd normally contains about 30 to 70 per cent water after this pressing operation. The freshly precipitated and pressed casein is readily dispersible to form compositions utilizable in the manufacture of paints and coating compositions, and in forming films, filaments, and other similar materials. However, the freshly precipitated moist casein curd is not stable, and in view of the fact that the localities where it is manufactured are usually located at considerable distances from the places where the casein is ultimately to be used in its industrial applications, it can rarely be used in its freshly precipitated form.

The moist casein curd is subject to a hydrolytic cleavage of the protein molecule, a gradual peptization, or a putrefaction, so that the casein tends to be degraded and broken down into simpler and less valuable proteins. The exact nature of the change is probably best described generally as hydrolysis, but the details of the chemical reactions are not understood in their entirety. That the relatively large proportion of moisture in the casein curd is instrumental in the degradation reaction is shown by the fact if the moist pressed curd is dried, and the remaining moisture removed before the casein is stored or shipped, such reactions do not take place.

The drying of the casein curd is not a simple operation; relatively high temperatures are required for economic efficiency and the process must be carefully controlled. The drying requires extensive and expensive equipment if a utilizable dried product is to be obtained. For this reason, producers of casein in relatively small quantities have found it exceedingly difficult to utilize or dispose of the casein, unless they were close to a plant having the drying equipment. Even then it is necessary that the moist curds be shipped and then dried before the hydrolysis or decomposition reactions begin. This dependency of the small producer upon nearby satisfactory drying equipment has made the utilization of casein by the small producer a particularly difficult problem.

It is an object of my invention to provide a simple and yet effective process whereby the drying of the moist casein curd is rendered unnecessary, and in which the freshly precipitated curd is so treated that it is immediately available as a stable article of commerce.

Even though it is possible to dry the casein in accordance with the best known methods, certain undesirable properties are imparted to the casein during the drying operation. As a result of the drying, the casein shrinks and contracts to a great extent. No doubt, certain chemical reactions or molecular rearrangements in the protein molecule take place. As a result, when the dried casein is subsequently to be used in an aqueous solution in connection with paints, films, or coating compositions, it is very difficult to discoating compositions, it is very difficult to disperse as compared with the freshly precipitated curd. It has been found that dried casein also has relatively poor adhesive properties and, unless the drying is carefully controlled, it may be rendered in part or entirely insoluble, so that its dispersion is impossible. In fact, dried casein produced from certain types of milk, for example, buttermilk, is dispersible only with the greatest difficulty, if at all. The disadvantages of the drying process have long been recognized, but the process has been heretofore considered necessary, even though undesirable properties are imparted to the casein by the drying.

It is, therefore, another object of my invention to provide a moist casein curd that is stable and free from decomposition over long periods of time, and that has all of the properties of a freshly precipitated curd and none of the disadvantages of dried casein.

The present invention makes it possible for the original casein producer to ship undried casein curds direct to the ultimate user, a practice heretofore considered impossible, although long desired. In addition to making the drying of the pressed casein curd unnecessary, the present invention provides paint manufacturers paper coaters, and the like, with an improved product that is readily dispersible and heretofore unavailable commercially.

It is also an object of my invention to treat the moist casein curd so that it is not only stabilized, but is also rendered more readily dispersible than is dried or untreated fresh casein, when it is subsequently placed in solution.

I have discovered that the moist freshly formed casein curd, after having the excess water pressed therefrom, may be stabilized by mixing therewith a relatively small portion of a compound, herein termed "water binding agent." Any type of mixing operation may be employed for treating the curds with the compound. The presence in the moist casein of a relatively small amount of the water binding agent causes the water in the protein curd to become fixed in the casein, either by some chemical combination in the protein molecule, or by some physical association in the interstices in the casein curd. The water binding agent, therefore, tends to make the casein hydrophilic. The treated casein is not subject to hydrolytic cleavage of the protein molecule, nor any other reactions that would deleteriously affect the casein if not so treated. In addition the water does not separate by "weeping," a phenomenon associated with the unstabilized moist protein curd.

My stabilized casein has a dry appearance and may be handled as a dry product; however, all of the original moisture is still contained and stabilized in the curd. This dry appearance and associated properties render the product suitable for shipment in bags as an article of commerce. The material is not hydroscopic, nor does it readily dry out and lose its stabilized moisture content.

The exact chemical or physical action by which the water binding agent imparts the stabilizing properties to the wet casein curd is not entirely known to me. The action is apparently quite complex and, therefore, renders exhaustive determination extremely difficult. The ultimate result is similar to hydration by which water is held combined in some manner with a chemical compound. At any event, the water is fixed in the curd in such a manner that it is not available for entering into or causing the degradating reactions. Although my invention is not to be limited by any theoretical explanations, my investigations indicate that the water binding agents ionize readily in the presence of water and that the complex protein molecules may selectively adsorb certain of the ions, which are effective for preventing hydrolytic cleavage of the protein molecule.

The moist casein, after the initial pressing, contains from about 30 per cent to 70 per cent of moisture, depending upon the conditions of precipitation and the extent to which the water has been removed by pressing. The amount of the water binding agent I employ, based upon dry casein, may vary over wide limits. Good results may be obtained by employing as low as 3 per cent and as high as 15 per cent of the water binding agent. The use of less than 3 per cent does not insure complete stabilization of the protein curd in all instances, although when the product is to be stabilized for a relatively short period of time, less than this amount might be used. Amounts greater than 15 per cent may be used, although ordinarily it is uneconomical to employ a larger amount, because amounts above 15 per cent do not produce any substantial additional advantages. Ordinarily, I prefer to employ 5 per cent to 10 per cent of the water binding agent.

My investigations have shown it to be highly desirable, before adding the water binding agent to wash the freshly precipitated curd with water in order to remove the whey which contains a relatively high percentage of lactose (milk sugar) and lactalbumin. The presence of lactose in a wet casein curd increases the danger of putrefaction by bacterial decomposition, and is one of the causes of yellowing upon drying of articles fabricated from the casein. In order to insure against deterioration in this manner, a small amount of any antiseptic agent may also be added, such as pine oil, or sodium benzoate. This is not essential to my process because the water binding agent not only prevents disintegration of the complex casein molecules by hydrolysis, but in addition, prevents bacterial putrefaction to a large extent. Particularly is the use of an antiseptic unnecessary if the casein has been washed well before the addition of the water binding agent.

It will be understood by those skilled in the art that the stabilized moist casein curd may be dispersed in an aqueous medium by the use of alkalies, ammonia, borax or soap, as is described in my co-pending application Serial No. 142,574, filed May 14, 1937. In all of these processes, for example, as is described in my Patent No. 1,893,608, a material of the type herein termed a water binding agent, greatly assists in the final dispersion of the casein. The water binding agent not only has the property of stabilizing the moist casein curd, but also has the function of assisting in dispersing the casein when it is placed in solution in connection with its various industrial uses.

Although my invention has been described particularly in connection with casein, it has been found to be particularly applicable to the other proteins such as soya protein and blood fibrin which may similarly be treated, and are therefore included in my invention.

In accordance with my invention, a colored casein curd may be prepared and is particularly adaptable for use in the formation of colored casein paints or films. The colored casein curd may be prepared by the addition of dyes or pigments such as toluidine red, hansa yellow, celestial blue, zinc sulphide, titanium dioxide and the like to the skim milk prior to the precipitation of the casein. The organic dyes, insoluble lakes or pulp colors used should be inactive, that is, selected from a group of materials that do not coagulate casein curd. The fine particles of casein dispersed in skim milk absorb the dye or pigment when the casein is precipitated, and forms a colored casein curd from which colored paints and films may be manufactured.

The colored casein curd may be stabilized by the addition of water binding agents as previously described, thereby rendering drying and its accompanying disadvantages unnecessary. The colored casein curd is in a readily dispersible condition that permits the color to be uniformly mixed with the dispersed casein.

Examples of water binding agents I may employ are alkali metal salts, such as sodium fluoride, sodium formate, sodium stannate, sodium oxalate, sodium benzoate, sodium furoate, sodium sulphocyanate, and the like. Similar potassium salts may be employed, as well as ammonium salts. In addition, amine salts including the alkyl amine and hydroxyamine salts, such as the triethanolamine salts may be used. While the latter salts may be used to produce my advantageous result, my investigations show that the alkali metal salts are to be preferred.

By the term "water binding agent" I refer to those chemical compounds that hold moisture closely associated with the complex protein, prevent shrinkage of the wet expanded protein curd, prevent hydrolytic cleavage of the protein and other chemical reactions into which water may enter or be a determining factor, and prevent "weeping" or drainage of the absorbed water from the moist protein curd.

The alkali metal, ammonium, alkyl amine and hydroxyamine compounds which have the water binding characteristics referred to in the claims are those compounds which fulfill the following simple test: When equal portions of freshly precipitated milk casein curd, coagulated and washed in a usual commercial manner from fresh, sweet skim milk and containing 60 per cent of water by weight, are placed in two beakers and 15 per cent by weight of the compound is added to one of the beakers (on the dry weight of the casein) to give a pH of not over 5.5, and the two beakers are tightly covered and placed in an oven at 100° F. for about 24 hours, the casein in the curd containing the compound will be in substantially the same visual form (that is, in the apparently solid phase) as when placed in the oven while the curd without the salt will show two distinct phases, one of which will be relatively clear liquid and the other will be a more concentrated casein than in the original curd.

The various chemical compounds which have this property do not appear to fall in any particular chemical class and this property does not appear to be dependent upon any particular chemical structure, except in so far as the action may be obtained in accordance with the theory referred to previously. The novel action therefore, does not appear to be primarily a chemical one in which the chemical structure of the compound is a controlling criterion and the definition of the agents in terms of chemical structure is not possible.

I have disclosed a large number of compounds having this property which are available for the practice of my invention, but, no doubt, there are others which are capable of exerting an identical action in connection with a moist casein curd. Due to the complexity of the reaction and the relatively unknown nature of the exact action taking place, it is impossible to investigate completely and to name with certainty all of the compounds which have this property. However, having disclosed a liberal number, I intend my invention to include those compounds having similar properties and falling within the expression of "water binding agents," as herein defined.

It will be understood by those skilled in the art that my invention is not limited to the specific embodiments described herein. All modifications coming within the spirit and scope of my invention are intended to be covered by the claims appended hereto.

I claim:

1. The method of producing a stable, granular casein product of dry appearance adaptable for shipment in bags and free from dispersing agents, which comprises mixing moist, freshly formed casein curd containing not over 70% moisture with dry powdered sodium fluoride.

2. An undispersed casein curd of dry appearance, adaptable for shipment in bags, and stable over long periods of time, having a moisture content not substantially higher than the moisture content of freshly precipitated casein curd and being free from substantial quantities of dispersing agents, comprising freshly precipitated undried casein curd containing not over 70% moisture and an alkali metal fluoride, said salt preventing putrefaction and weeping thereof.

FRANCIS CLARKE ATWOOD.